（12）United States Patent
Johnson

(10) Patent No.: US 8,094,336 B2
(45) Date of Patent: *Jan. 10, 2012

(54) PRINTER WITH INTERPRETER

(75) Inventor: Kelly L. Johnson, Centerville, OH (US)

(73) Assignee: Avery Dennison Corporation, Pasadena, CA (US)

( * ) Notice: Subject to any disclaimer, the term of this patent is extended or adjusted under 35 U.S.C. 154(b) by 1125 days.

This patent is subject to a terminal disclaimer.

(21) Appl. No.: 11/870,842

(22) Filed: Oct. 11, 2007

(65) Prior Publication Data

US 2008/0024822 A1    Jan. 31, 2008

Related U.S. Application Data

(63) Continuation-in-part of application No. 10/193,557, filed on Jul. 11, 2002, now Pat. No. 7,283,268.

(51) Int. Cl.
G06F 15/00 (2006.01)

(52) U.S. Cl. ...................................................... 358/1.15

(58) Field of Classification Search ................. 358/1.15, 358/1.13, 1.14, 1.16, 1.18, 400, 402, 1.9, 358/1.1, 1.11; 399/18, 12, 15, 24, 366; 709/217, 709/225, 246, 248
See application file for complete search history.

(56) References Cited

U.S. PATENT DOCUMENTS

| 5,226,112 A | 7/1993 | Mensing et al. |
| 5,483,624 A | 1/1996 | Christopher et al. |
| 6,246,485 B1 * | 6/2001 | Brown et al. ................ 358/1.13 |
| 6,331,895 B1 | 12/2001 | Erickson et al. |
| 6,411,397 B1 | 6/2002 | Petteruti et al. |
| 6,993,521 B2 * | 1/2006 | Aull .............................. 713/156 |

* cited by examiner

Primary Examiner — Saeid Ebrahimi Dehkordy

(57) ABSTRACT

A printer for printing on a web of record members such as labels, tags, etc. includes an interpreter and a memory for storing an application program. The interpreter is enabled or disabled by the receipt of a command. When enabled, the interpreter processes an application program to extract data from a received data stream and to construct one or more data packets in a predetermined printer control language to be sent to a parser. When the interpreter is disabled, the received data may be processed by an XML or PCL task and forwarded to the parser, bypassing the interpreter.

22 Claims, 4 Drawing Sheets

PRINTER WITH INTERPRETER

This application is a continuation-in-part application of U.S. application Ser. No. 10/193,557 filed Jul. 11, 2002 the entire disclosure of which is hereby incorporated in its entirety.

FIELD OF THE INVENTION

The present invention is directed to a printer for printing on a web of record members such as labels, tags, etc. and more particularly to such a printer having an application program and interpreter that can be enabled or disabled to allow the printer to be operated to print with or without an application program.

BACKGROUND

Label/tag printers are known that include an application program stored in a programmable memory and an interpreter for processing all data input to the printer in accordance with the application program as shown in U.S. Pat. No. 5,483,624. These printers can manipulate received data in accordance with the application program but they are not operable to print without an application program. Other label/tag printers are known that receive data in a predetermined format for printing; however, these printers cannot manipulate the received data and can only print data if it is received in the predetermined format.

BRIEF SUMMARY

In accordance with the present invention, the disadvantages of prior label/tag printers have been overcome. The printer of the present invention includes an interpreter and a memory for storing an application program wherein the interpreter can be enabled or disabled to allow the printer to be operated to print with or without an application program.

More particularly, the printer of the present invention includes a printing module having a printhead and a motor for driving the web of record members past the printhead for printing thereon. The printer includes a communication interface for receiving commands and various data streams. An image generator is responsive to printer data for generating record member image data that is coupled to the printhead for printing. A printer control language parser is responsive to data in a predetermined printer control language for parsing the printer control language data to the image generator. The interpreter, when enabled, processes a stored application program to extract data from a received data stream and to construct therefrom one or more data packets in the predetermined printer control language to be sent to the parser. An executive processor is responsive to the receipt of an enable command to send subsequently received data streams to the interpreter and is responsive to a disable command to send subsequently received data streams to the parser, bypassing the interpreter.

In another aspect of the invention, an extensible mark-up language or printer control language (PCL) task may be executed by an executive processor bypassing the interpreter to construct one or more data packets for printing. The received data may be analyzed and the particular task downloaded and executed based on the received data stream.

The printer of the present invention processes data for printing faster when the interpreter is bypassed; however, the printer is extremely flexible in that it may be operated in accordance with an application program to manipulate data received by the printer. These and other advantages and novel features of the present invention, as well as details of an illustrated embodiment thereof, will be more fully understood from the following description and drawings.

DETAILED DESCRIPTION

Figure 1:
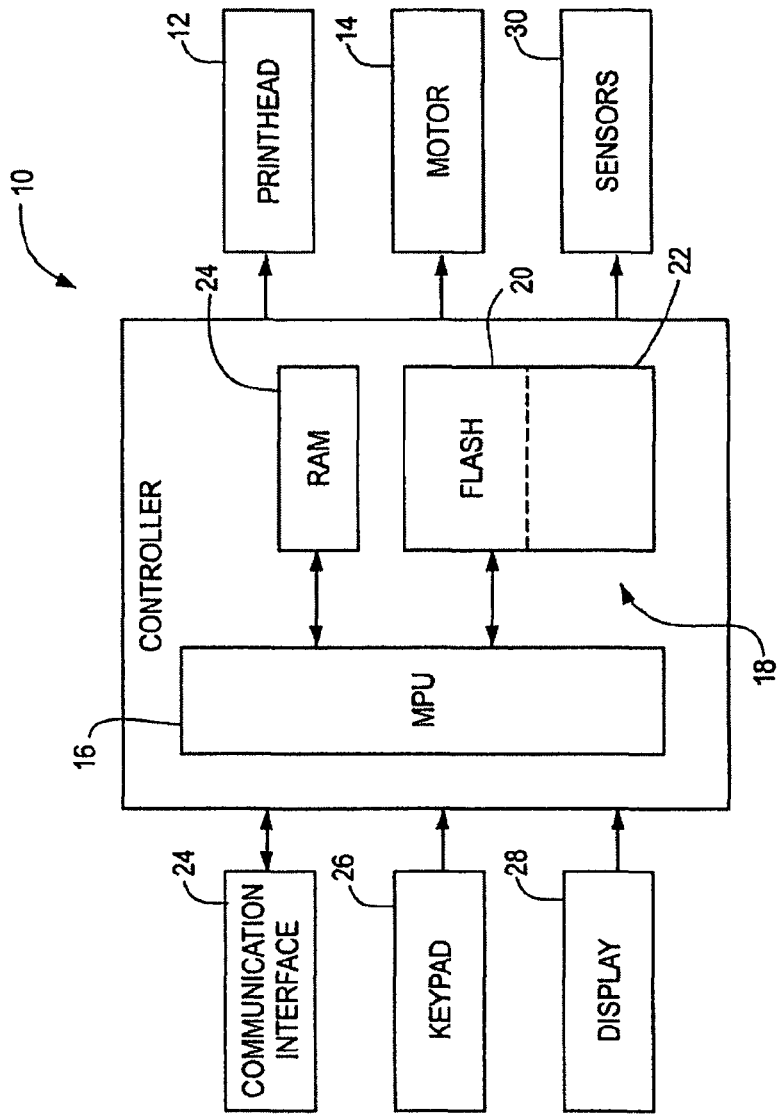
FIG. 1 is a block diagram of the printer in accordance with an aspect of the invention.

The printer 10 of the present invention includes a printhead 12, that may be a thermal printhead or the like and a motor 14 for driving a web of record members, such as labels, tags, etc. past the printhead 12 for printing thereon. The information printed on a record member is determined by a microprocessor 16 operating in accordance with firmware/software stored in a flash memory 18 and data stored in a RAM 24.

The flash memory 18 includes an area 22 to which access is restricted, the area 22 of the flash memory 18 storing the firmware of the printer 10. An unrestricted area 20 of the flash memory 18 stores an application program that can be downloaded into the printer 10 via a communication interface. It is noted, that the area 22 of the flash memory may be restricted such that a special loader is required to write to the area 22 of the flash memory. It should be apparent, however, that other methods of restricting or limiting access to the flash memory area 22 may also be employed. In an alternative embodiment, the application program may be stored in other types of programmable, non-volatile memories such as a battery-backed RAM. Similarly, the firmware of the printer 10 may be stored in a ROM-type of memory such as an EPROM or an EEPROM. The printer 10 receives data and commands via a communication interface 24. The communication interface 24 may include a radio frequency transceiver and/or one or more communication ports such as a RS 232 port. The printer 10 includes a keypad 26 with a number of keys actuable by a user to provide inputs or commands to the printer 10. The keypad inputs may be used to initiate various operations of the printer such as to control the motor 14 to advance a web of record members or to control the printer 10 to provide various status information. In another embodiment, the keypad 26 is also used to enter data to be printed. A display 28 is used to provide a menu to the user. The display 28 is utilized to prompt the user to make various selections via the keypad 26 and to display status information. The printer 10 includes a number of sensors 30. These sensors are used to register a web of record members with the printhead 12, to sense the temperature of the printhead 12, to monitor a battery if the printer is battery powered, etc.

Figure 2:
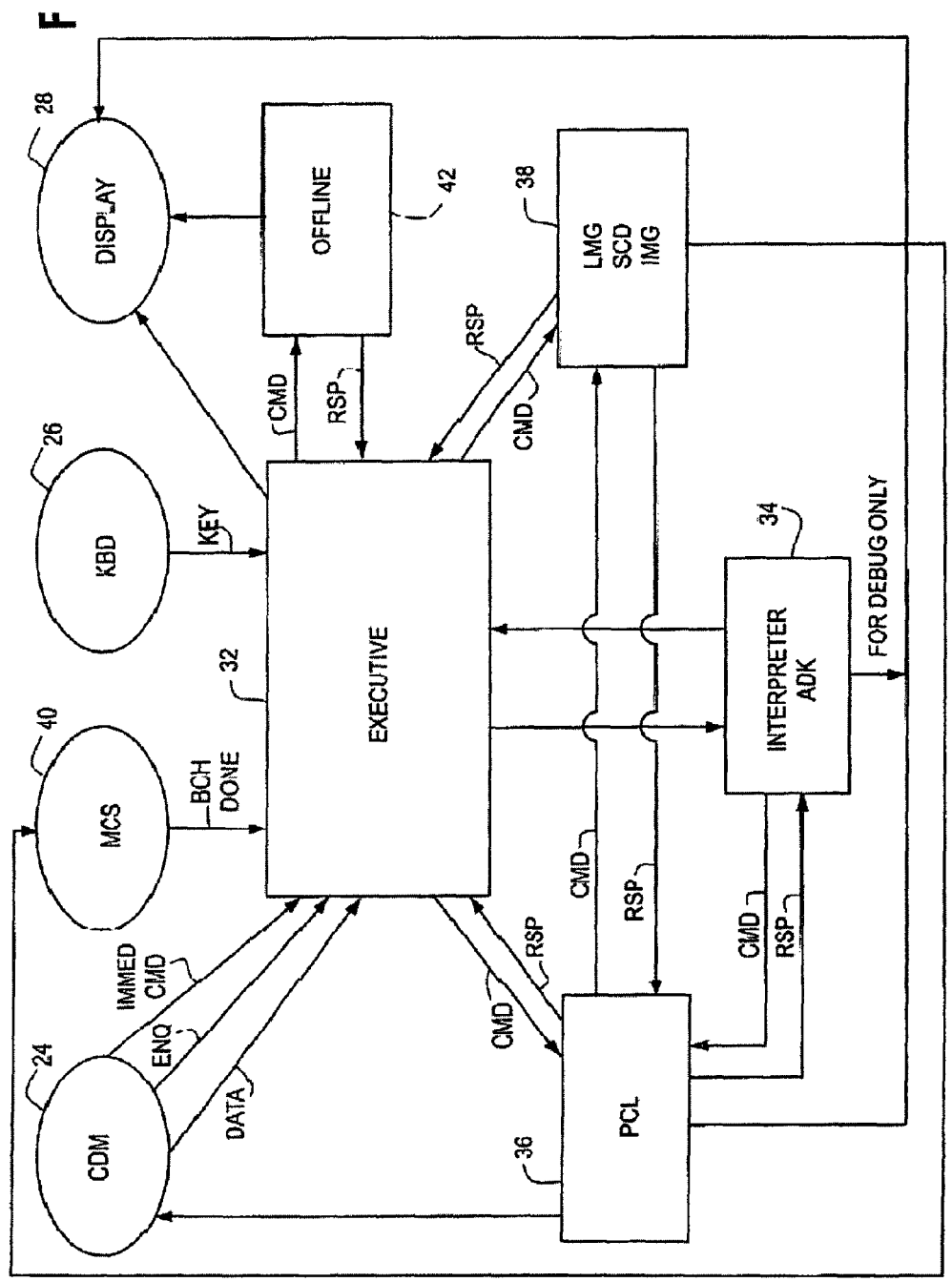
FIG. 2 is a block diagram of the firmware and hardware interface for the printer of FIG. 1 in accordance with an aspect of the invention.

As shown in FIG. 2, the firmware of the printer 10 includes an executive task 32, which when implemented by the microprocessor 16, is responsive to inputs received by the communication interface 24 and the keypad 26 to process immediate commands and inquiries and to determine whether received data is to be processed via an interpreter 34 in accordance with an application program stored in the flash memory 18 or not, depending upon whether the interpreter is enabled or disabled as discussed below. When enabled, the interpreter 34 processes a stored application program to extract data from a received data stream, to manipulate the data, if necessary, and to construct from the extracted and/or manipulated data one or more data packets in a predetermined printer control language. The interpreter 34 sends the printer control language packets to a printer control language parser 36. The parser 36 parses the data received in the predetermined printer control language to extract format information, font information, and the data to be printed on a record member. The parser sends the parsed information to an image generator task 38. The image generator task 38 when implemented by the microprocessor 16 is responsive to printer data received from the parser and the format and font information for generating record member image data. The record member image data is data arranged to form an image of the printed record member. The record member image data generated by the image generator 38 is coupled to a printing system 40 that includes the printhead 12 and the motor 14 for printing the data on a record member. The executive task 32 controls the display 28 in response to on-line commands received via the communication interface 24 or in response to off-line commands such as received from the keyboard 26 in accordance with an off-line task 42.

The executive task 32 is responsive to the receipt of an enable command to send subsequently received data streams to the interpreter 34 for processing via a stored application program. The executive task 32 is responsive to the receipt of a disable command to send subsequently received data streams directly to the parser 36, bypassing the interpreter 34 so as to allow the printer 10 to be operated to print data with or without an application program.

Figure 3:
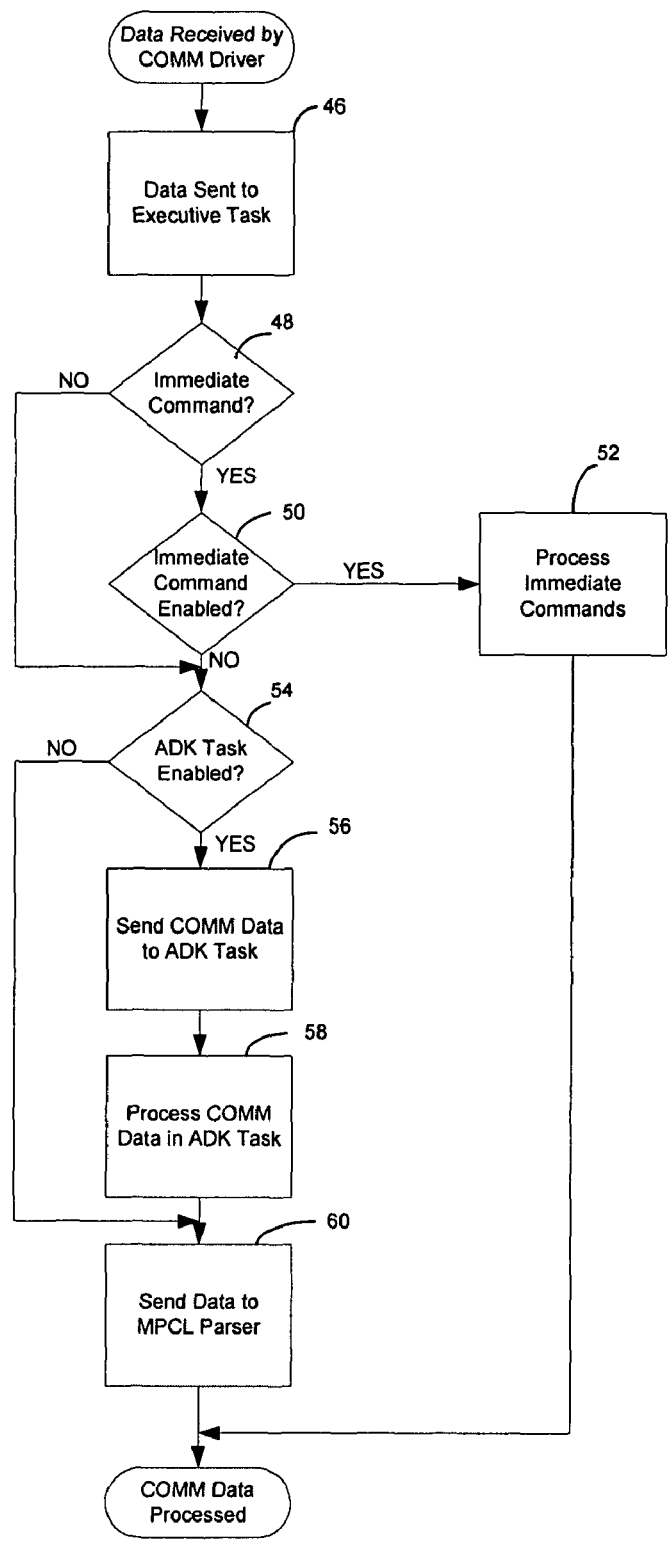
FIG. 3 is a flow chart illustrating the processing of data received by the printer of FIGS. 1 and 2 in accordance with an aspect of the invention.

As shown in FIG. 3, when data is received by a communication driver associated with the communication interface 24, the data is sent at block 46 to the executive task 32. The microprocessor 16 determines at block 48 whether the received information is an Immediate Command. If it is an Immediate Command, the microprocessor determines at a block 50 whether Immediate Commands have been enabled to be processed by the printer 10. If so, the microprocessor 16 processes the Immediate Command at block 52.

An example of an Immediate Command is a command that causes the printer to enter a mode to load an application program. This is an on-line mode in which the printer 10 is expecting to receive an application program and will typically not respond to print data. As each packet associated with the application program is received, the printer responds to the host computer. Alternatively, a similar Immediate Command can be used to enter a mode to load an application program but without responses being sent to the host. The command to enable and disable the interpreter 34, and thus an application program, is also an Immediate Command processed by the microprocessor 16 in accordance with the executive task at block 52. If an application program has been loaded and is stored in the flash memory 18 but is currently disabled, this command will enable the application program. If an application program has been loaded and is currently stored in the flash memory 18 and is currently enabled when the command is received, the microprocessor 16 will disable the interpreter and thus the application program. If no application has been loaded in the flash memory 18, the microprocessor 16 ignores the enable/disable command. Another Immediate Command causes the microprocessor 16 to upload via the communication interface 24 the name of the current application program stored in the flash memory 18 along with an associated version number. Another example of an Immediate Command is a command to delete the current application program in the printer 10. It is noted that when an application program is deleted it may simply be marked as deleted but need not be removed from the flash memory 18. If there is no current application program in the printer 10 when the delete command is received, the microprocessor 16 merely ignores the command. The microprocessor 16 can also respond to other types of Immediate Commands by processing the commands at block 52 upon receipt.

The microprocessor 16 in accordance with the executive task 32 proceeds to block 54 from block 48 if the information received is not an Immediate Command as determined at block 48. At block 54, the microprocessor 16 determines whether the interpreter task 34 has been enabled by a previously received Immediate Command. If the interpreter 34 has been enabled, the received data is sent to the interpreter 34 so as to be processed by the interpreter in accordance with the application program stored in the area 20 of the flash memory 18. As discussed above, the interpreter processes the stored application to extract data from a received data stream and to manipulate the data in other ways in accordance with the application program. The manipulation of data may include rearranging the data; combining received data with other data identified in the application program, etc. From the extracted and/or manipulated data, the interpreter constructs one or more data packets in the predetermined printer language that can be parsed by the parser 36. The interpreter then sends the data packets in the predetermined printer language to the parser 36 at block 60. If the interpreter 34 is disabled as determined by the microprocessor at block 54, the microprocessor 16 proceeds from block 54 directly to block 60 to send the received data directly to the parser 36, bypassing the interpreter 34.

The printer of the present invention can process received data in accordance with an application program so as to be able to handle data in a foreign printer control language, i.e. a printer language other than the predetermined printer control language to which the parser is responsive. If data is received in the predetermined printer control language, the interpreter can be disabled and the received data sent directly to the parser 36 for extremely fast throughput. This feature of the present invention allows the printer to be operated in the most efficient manner possible, with or without an application program.

Figure 4:
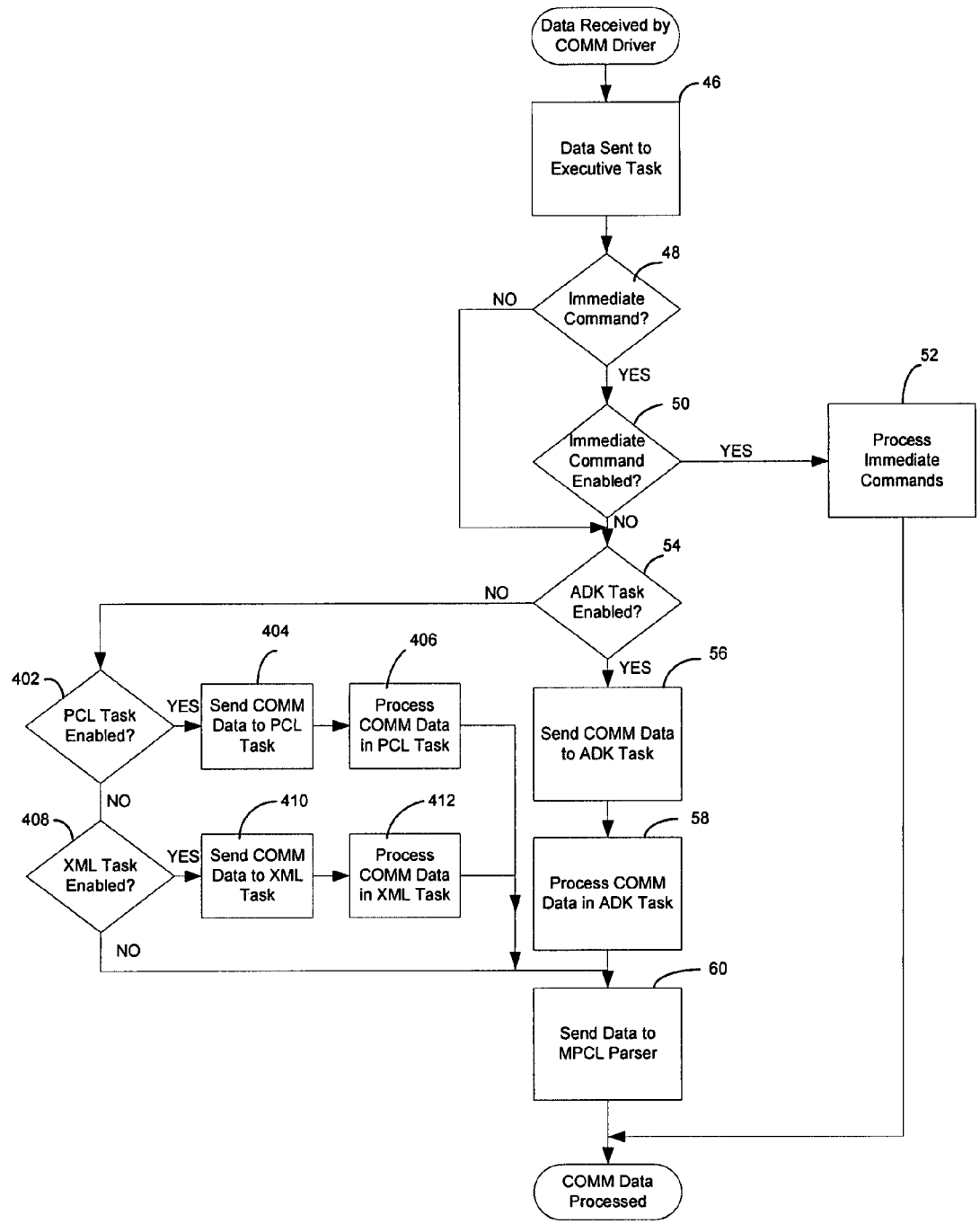
FIG. 4 is an additional flow chart illustrating the processing of data received by a printer of FIGS. 1 and 2 in accordance with an aspect of the invention.

FIG. 4 illustrates another aspect of the invention. In FIG. 4, when data is received by a communication driver associated with the communication interface 24, the data is sent at block 46 to the executive task 32. In this embodiment, different tasks may be used to handle different received data streams. For instance, extensible mark-up language or printer control language (PCL) data streams may be recognized and handled by various different tasks bypassing the interpreter 34. In an embodiment, the extensible mark-up language may include XML. In another embodiment, the printer control language (PCL) may include numerous different printer control languages such as Easy Plug language, IPL (Intermec Printer Language), or PGL (Printronix Graphic Language), or ZPL (Zebra Programming language). In another aspect of the invention, the received data stream may be analyzed and a particular task may be downloaded based on the information located in the data stream.

In FIG. 4, a microprocessor 16 determines at block 48 whether the received information is an Immediate Command. If it is an Immediate Command, the microprocessor determines at a block 50 whether Immediate Commands have been enabled to be processed by the printer 10. If so, the microprocessor 16 processes the Immediate Command at block 52.

An example of an Immediate Command is a command that causes the printer to enter a mode to load an application program and/or ADK task. This is an on-line mode in which the printer 10 is expecting to receive an application program and will typically not respond to print data. As each packet associated with the application program is received, the printer responds to the host computer. Alternatively, a similar Immediate Command can be used to enter a mode to load an application program but without responses being sent to the host. The command to enable and disable the interpreter 34, and thus an application program, is also an Immediate Command processed by the microprocessor 16 in accordance with the executive task at block 52. If an application program has been loaded and is stored in the flash memory 18 but is currently disabled, this command will enable the application program. If an application program has been loaded and is currently stored in the flash memory 18 and is currently enabled when the command is received, the microprocessor 16 will disable the interpreter and thus the application program. If no application has been loaded in the flash memory 18, the microprocessor 16 ignores the enable/disable command. Another Immediate Command causes the microprocessor 16 to upload via the communication interface 24 the name of the current application program stored in the flash memory 18 along with an associated version number.

In another aspect of the invention, an Immediate Command may cause the printer to enter a mode to load an application program and/or ADK task which may be initiated through use of a keyboard. In an embodiment, the printer may be placed in off-line mode to download the Immediate Command.

Another example of an Immediate Command is a command to delete the current application program in the printer 10. It is noted that when an application program is deleted it may simply be marked as deleted but need not be removed from the flash memory 18. If there is no current application program in the printer 10 when the delete command is received, the microprocessor 16 merely ignores the command. The microprocessor 16 can also respond to other types of Immediate Commands by processing the commands at block 52 upon receipt.

In an embodiment, an extensible markup language task such as a XML task may be stored in memory. An XML task may allow the printer to interrupt a XML data stream received by the COMM driver, bypassing the interpreter 34. In another embodiment, a language task such as a PCL task may be downloaded and stored in memory. The PCL task may allow the printer to interrupt a PCL data stream received by the COMM driver, bypassing the interpreter 34.

The microprocessor 16 in accordance with the executive task 32 proceeds to block 54 from block 48 if the information received is not an Immediate Command as determined at block 48. At block 54, the microprocessor 16 determines whether the interpreter task 34 has been enabled by a previously received Immediate Command. Those skilled in the art will realize that the interpreter task 34 may be created externally from the printer and in an embodiment downloaded into the printer when placed in a receiving mode. In an embodiment, the interpreter task 34 may be in the form of a script or other executable code based on a defined protocol.

If the interpreter 34 has been enabled as determined by the microprocessor at block 54 (ADK task), the received data is sent to the interpreter 34 to be processed by the interpreter at block 58 in accordance with the application program stored in the area 20 of the flash memory 18. As discussed above, the interpreter 34 processes 58 the stored application to extract data from a received data stream and to manipulate the data in other ways in accordance with the application program. The manipulation of data may include rearranging the data; combining received data with other data identified in the application program, etc. From the extracted and/or manipulated data, the interpreter 34 constructs one or more data packets in the predetermined printer language that can be parsed by the parser 36. The interpreter then sends the data packets in the predetermined printer language to the parser 36 at block 60.

If the interpreter 34 is disabled as determined by the microprocessor 16 at block 54 (ADK Task), the microprocessor 16 proceeds from block 54 to block 402 to determine if a PCL task has been enabled. If the PCL task is enabled 402, then the received data may be forwarded 404 to be processed 406 in accordance with the PCL task, bypassing interpreter 34. After processing by the PCL task 406, the one or more data packets by may be parsed by the parser 36 at block 60.

If the PCL task is disabled at block 402, then at block 408 the microprocessor determines if an XML task is enabled. If the XML task is enabled 408, then the received data may be forwarded 410 to be processed 412 in accordance with the XML task, bypassing interpreter 34. After processing by the XML task 412, the one or more data packets by may be parsed by the parser 36 at block 60. Those skilled in the art will realize that the PCL task and XML tasks though illustrated in series in the exemplary embodiment may be implemented in parallel with each other in an alternative embodiment.

The printer of the present invention can process received data in accordance with an application program so as to be able to handle data in a foreign printer control language, i.e. a printer language other than the predetermined printer control language to which the parser is responsive. If data is received in the predetermined printer control language, the interpreter can be disabled and the received data sent directly to the parser 36 for extremely fast throughput. This feature of the present invention allows the printer to be operated in the most efficient manner possible, with or without an application program.

Many modifications and variations of the present invention are possible in light of the above teachings. Thus, it is to be understood that, within the scope of the appended claims, the invention may be practiced otherwise than as described hereinabove.

I claim:

1. A printer comprising:
a memory for storing an application program;
a processor coupled to the memory, the processor configured to perform the steps comprising:
receiving a command to enable or disable an interpreter task;
determining if the interpreter task has been enabled or disabled;
receiving a data stream;
sending the data stream to the interpreter task if enabled to construct therefrom one or more data packets in a predetermined printer control language to be sent to one or more tasks for printing;
sending the data stream directly to an extensible markup language task if the interpreter is disabled; and
executing the extensible markup language task, bypassing the interpreter.

2. The printer as recited in claim 1, wherein the interpreter manipulates received data in accordance with the application program.

3. The printer as recited in claim 1, wherein the application program is stored in a flash memory.

4. The printer as recited in claim 3, wherein said interpreter includes software stored in an area of the flash memory to which access is limited.

5. The printer as recited in claim 1, wherein the processor is responsive to each of a predetermined set of commands to process the commands upon receipt, bypassing the interpreter even if enabled.

6. The printer as recited in claim 1, wherein the set of commands processed by the processor upon receipt includes the enable and disable command.

7. The printer as recited in claim 1, wherein the extensible markup language task comprises a XML task.

8. A printer comprising:
a printing module including a printhead and a motor;
a communication interface for receiving a plurality of commands and data streams;
a memory for storing an application program; and
a processor coupled to the memory and operating in accordance with a plurality of tasks including:
a parser task for parsing data in a predetermined control language to be sent to the image generator task;
an interpreter task that can be enabled or disabled, the interpreter task when enabled, processing a stored application to construct one or more data packets in the predetermined printer control language to be sent to the parser; and
an executive task, the executive task sending data streams to the interpreter when the interpreter is enabled and sending data streams to the parser, bypassing the interpreter when the interpreter is disabled.

9. The printer as recited in claim 8, wherein the executive task is responsive to each of a predetermined set of commands to process the commands upon receipt, bypassing the interpreter even if enabled.

10. The printer as recited in claim 9, wherein the set of commands processed by the executive task upon receipt includes the enable and disable command.

11. The printer as recited in claim 9, wherein the set of commands processed by the executive task upon receipt includes a command to load an application program into the printer.

12. A printer comprising:
a memory for storing an application program;
a processor coupled to the memory, the processor configured to perform the steps comprising:
receiving a command to enable or disable an interpreter task;
determining if the interpreter task has been enabled or disabled;
receiving a data stream;
sending the data stream to the interpreter task if enabled to construct therefrom one or more data packets in a predetermined printer control language to be sent to one or more tasks for printing;
sending the data stream directly to a PCL task if the interpreter is disabled; and
executing the PCL task, bypassing the interpreter.

13. The printer as recited in claim 12, wherein the interpreter manipulates received data in accordance with the application program.

14. The printer as recited in claim 12, wherein the application program is stored in a flash memory.

15. The printer as recited in claim 14, wherein said interpreter includes software stored in an area of the flash memory to which access is limited.

16. The printer as recited in claim 12, wherein the processor is responsive to each of a predetermined set of commands to process the commands upon receipt, bypassing the interpreter even if enabled.

17. The printer as recited in claim 16, wherein the set of commands processed by the processor upon receipt includes the enable and disable command.

18. A method comprising:
receiving a command to enable or disable an interpreter task;
determining if the interpreter task has been enabled or disabled;
receiving a data stream;
sending the data stream to the interpreter task if enabled to construct therefrom one or more data packets in a predetermined printer control language to be sent to one or more tasks for printing; and
sending the data stream directly to a PCL task, bypassing the interpreter, for printing if the interpreter is disabled.

19. The method of claim 18 further including:
receiving an immediate command; and
processing the immediate command upon receipt, bypassing the interpreter even if enabled.

20. A method comprising:
receiving a command to enable or disable an interpreter task;
determining if the interpreter task has been enabled or disabled;
receiving a data stream;
sending the data stream to the interpreter task if enabled to construct therefrom one or more data packets in a predetermined printer control language to be sent to one or more tasks for printing; and
sending the data stream to an extensible markup language task, bypassing the interpreter, for printing if the interpreter is disabled.

21. The method of claim 20 further including:
receiving an immediate command; and
processing the immediate command upon receipt, bypassing the interpreter even if enabled.

22. The method of claim 20, wherein the extensible markup language task comprises a XML task.

* * * * *